UNITED STATES PATENT OFFICE.

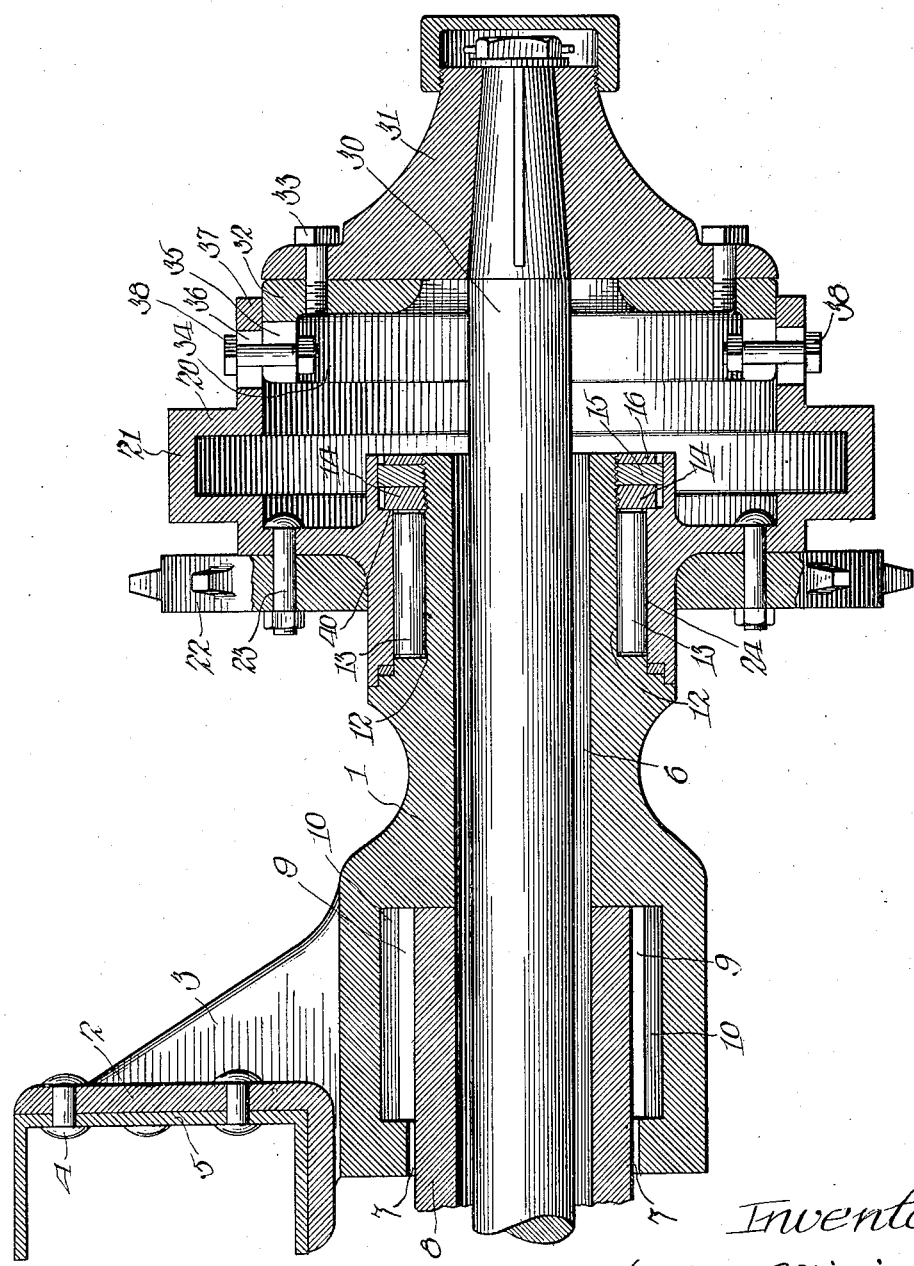

HARRISON R. WILLIAMS, OF CHICAGO, ILLINOIS, ASSIGNOR TO DEARBORN TRUCK COMPANY.

DEVICE FOR AUTOMOBILE CONVERSION.

1,342,142. Specification of Letters Patent. Patented June 1, 1920.

Application filed March 15, 1917, Serial No. 155,060. Renewed October 22, 1919. Serial No. 332,573.

*To all whom it may concern:*

Be it known that I, HARRISON R. WILLIAMS, a citizen of the United States, residing at the city of Chicago, in the county of Cook and State of Illinois, have invented certain new and useful Improvements in Devices for Automobile Conversion, of which the following is a specification.

My invention relates to mechanism which may be used for the transformation of road automobiles into motor trucks. In making such change it is necessary to greatly increase the strength of the frame and its weight carrying capacity. This is usually done by adding an auxiliary frame with a stationary rear axle and wheels thereon driven by sprocket chains from sprocket wheels on what was the rear axle of the original car. For this purpose such rear axle is mounted on hangers securely attached to the added or auxiliary frame. But as automobiles of different manufacture vary in their structure and in the size and form of their original axle, it is necessary either to make hanger attachments which will conform to the varying structure of different cars or to confine the transformation to cars of a single manufacture, and thus enable standard attachments to be used. It is the object of my invention to provide means by which the hangers and hanger attachments for such transformation may be adjusted so as to be used in connection with the rear axles and rear axle housing of any standard car which it is desired to utilize for that purpose. I also provide devices which are simple and inexpensive, and by means of which only minor changes are necessary in such of the old or original material as may be put in service.

The principles of my invention are illustrated in the drawing forming a part of this specification, in which my improved hanger is shown in vertical longitudinal section as attached to one of the longitudinal bars of a motor truck chassis.

Further describing my invention with reference to said drawing, 1 is a body portion or casing of my improved hanger. 2 is a flange, and 3 a strengthening web by which it is attached to the chassis bar 5. The body of the said hanger is provided with a longitudinal bore 6 of sufficient diameter to take the variations in shaft sizes of ordinary standard automobiles, and the inside portion thereof is enlarged at 7 to accommodate the ends of the rear shaft housings 8 in the varying sizes in which they are found. A clamping device, consisting of dogs 9, surrounding said shaft housing and operated by set screws or other means (not shown) is provided for in the larger recess 10 in said housing. The outer end of said axle casing is machined at 12 to form a seat for the roller bearings 13, which may be mounted thereon and secured in place by the internally threaded ring 14, which is turned upon the ends of the shaft hanger 1, externally threaded to receive it. A felt packing ring 15, held in place by the retaining ring 16, may also be provided. A driving casing or member 20 provided with a brake drum 21 has a transmission member consisting of a sprocket wheel 22 attached thereto by means of bolts 23. The inner end thereof is machined at 24 to form an annular seat for the bearings 13 and the relation of the parts described to each other is preferably such that the sprocket wheel 22 is over and in the central plane of the bearings 13.

By means of the devices thus described, I am able to use the rear shaft 30 of an automobile which is to be converted into a motor truck as a jack-shaft by which the wheels on the dead axle of the motor truck are to be driven. The original hub 31 may also be used, the other portions of the wheel being discarded. As the spokes of different machines vary in thickness adjustment thereof must be provided, and this may be done by means of the adjustment ring 32, which is secured to the hub by tap bolts 33. It is provided with an annular flange 34, having transverse slots 35 corresponding to similar slots 36 in the outwardly projecting sleeve 37 in the shell of the power or driving casing 20. By means of the bolts 38 complete adjustment may be made to cover the slight variations in the different varieties of wheel construction which may be used in the process of transformation as above stated. The hub 31 is keyed on the axle 30 in the usual manner and as the axle revolves it drives the hub and the attached adjustment ring, casing and sprocket wheel, the journal support for the axle being found in the bearings 13. In the case of a full-floating axle the shaft and its attachments will be held in place by means of the locking ring 14, which is adapted to fit against the shoulder 40 within the driving casing, such locking ring being also adapted to hold the roller bearings in place as previously described. It is, however, pointed out that plain or other bearings may be used instead of the roller bearings shown, and that a similar construction of locking ring may be used to hold the parts described in proper relative position.

I claim:

1. In a device of the class described, a frame, a hanger secured to the frame and having a tubular casing rigidly receiving the end of a shaft housing and provided with an external bearing, a driving shaft extended through said casing and provided with a hub irrevolubly attached thereto, and a driving casing journaled on the hanger casing and secured to said hub.

2. In a device of the class described, a frame, a hanger secured to the frame and having a tubular casing rigidly receiving the end of a shaft housing and provided with an external bearing, a driving shaft extended through said casing and provided with a hub irrevolubly attached thereto, and a driving casing journaled on the hanger casing and adjustably secured to said hub.

3. In a device of the class described, a frame, a hanger secured to the frame and having a tubular casing rigidly receiving the end of a shaft housing and provided with an external bearing, a driving shaft extended through said casing and provided with a rigidly attached hub, a driving casing journaled on the hanger casing, a ring secured to said hub and provided with an annular flange, means for securing said annular flange to the driving casing, and a power transmission member on said driving casing.

4. In a device of the class described, a frame, a hanger secured to the frame and having a tubular casing rigidly receiving the end of a shaft housing and provided with an external bearing, a driving shaft extended through said casing and provided with a rigidly attached hub, and a driving casing journaled on the hanger casing, a ring secured to said hub and provided with an annular flange, means for securing said annular flange to the driving casing, and a power transmission member on said driving casing.

5. In a device of the class described, a frame, a hanger secured to the frame and having a tubular casing rigidly receiving the end of a shaft housing and provided with an external bearing, a shaft extended through said casing and provided with a rigidly attached hub, a driving casing rotatably mounted on said bearing, a sprocket wheel concentrically mounted on said driving casing in a radial plane of said bearing, and means for attaching said driving casing to said hub.

6. In a device of the character described, a jack-shaft hanger rigidly attached to the chassis and having a tubular body portion, a jack-shaft extended through said hanger and provided with a hub flange, a driving casing connected to said hub inwardly extended therefrom to overlap the shaft hanger and journaled thereon, and a sprocket wheel on the driving casing.

7. In a device of the character described, a jack-shaft hanger rigidly attached to the chassis and having a tubular body portion, a jack-shaft extended through said hanger and provided with a hub flange, a driving casing connected to said hub inwardly extended therefrom to overlap the shaft hanger and journaled thereon, means for securing said casing in operative position on the hanger, and a sprocket wheel on the driving casing.

8. In a device of the character described, a jack-shaft hanger rigidly attached to the chassis and having a tubular body portion, a jack-shaft extended through said hanger and provided with a hub flange, a driving casing connected to said hub inwardly extended therefrom to overlap the shaft hanger and journaled thereon, and a sprocket wheel on the driving casing substantially in the central bearing plane thereof.

9. In a device of the character described, a jack-shaft hanger rigidly attached to the chassis and having a tubular body portion, a jack-shaft extended through said hanger and provided with a hub flange, a driving casing connected to said hub inwardly extended therefrom to overlap the shaft hanger and journaled thereon, an annular seat by which it is journaled on the extended portion of the body of the hanger and provided with retaining shoulders, a retaining ring on said extended body portion to engage said shoulders, and a sprocket wheel on the driving casing.

10. A device for automobile conversion comprising a hanger having a shaft opening therethrough and provided with an external bearing, and devices journaled on said bearing and provided with means whereby they may be attached to the end of a shaft when extended through said shaft opening.

11. A device for automobile conversion comprising a hanger provided with an external bearing, devices journaled on said bearing and provided with means whereby they may be attached to the end of a shaft when extended through said shaft opening, and means carried by said hanger for adjustably receiving and securing the ends of a housing surrounding such shaft.

In witness whereof I have hereunto subscribed my name this 12 day of March, A. D. 1917, at Chicago, Cook county, Illinois.

HARRISON R. WILLIAMS.